INVENTOR
JACQUES MULLER

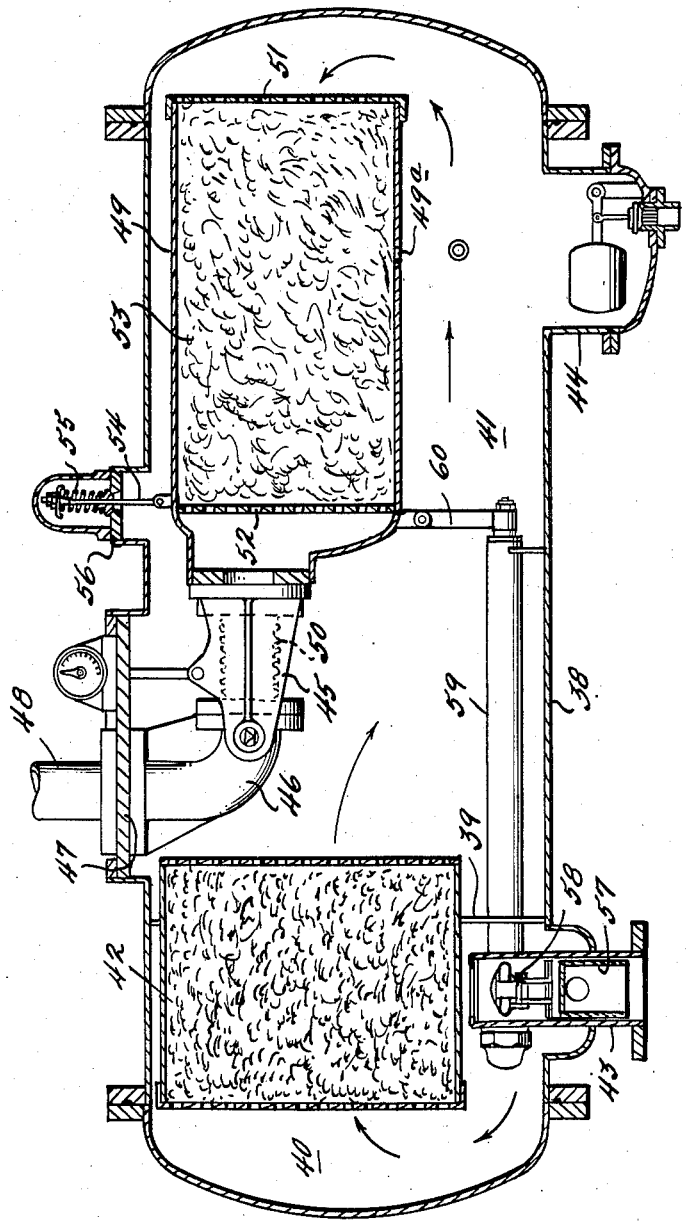

United States Patent Office 2,829,774
Patented Apr. 8, 1958

2,829,774

APPARATUS FOR SEPARATING LIQUIDS OF DIFFERENT DENSITIES

Jacques Muller, La Garenne-Colombes, France

Application December 30, 1954, Serial No. 478,691

Claims priority, application France April 23, 1954

6 Claims. (Cl. 210—114)

This invention relates in general to the separation of liquids of different densities from each other and more particularly has reference to apparatus for effecting such separation.

As a result of phenomena such as chemical or physical transformation, atmospheric effect or even handling, it frequently happens that certain liquids such as the hydrocarbons contain as impurities, liquids such as water, introduced or already contained in solution, and which condense under the effect of an external agent such as low temperature or precipitate under the effect of a chemical agent.

The foreign liquid or impurity resulting from condensation or precipitation, such as water which certain fuels contain, is generally invisible but nevertheless harmful to the functioning of an engine, and because of the imperfection in appearance or quality of the product which contains it, impedes the presentation or sale of the product.

It is therefore necessary to extract the impurity or foreign liquid. For this purpose, there have already been proposed various solutions based on the separation through difference in density or through absorption of the foreign liquid or impurity by a suitable agent.

However, the separation or absorption apparatuses developed up to now have been complicated, cumbersome and difficult to keep up.

In order to provide numerous almost microscopic cavities, communicating with each other, and rough surfaces which disintegrate for example the infinitely small particles of water, and have a vesicular constituency, there are generally used fibers of wood or the like which are more or less compressed in a chamber which the liquid to be purified traverses horizontally. Due to the opposing progression, the particles of water conglomerate progressively and fall as a result of their greater density relative to that of the liquid to be purified. The mass of water accumulates in the bottom of the chamber and finally runs out through a suitable channel.

The present invention is based on this principle and has as its primary object, in addition to the provision of an apparatus in which the liquid to be purified flows, the provision of apparatus which is equipped with an automatic device that stops the flow of the liquid to be purified and at the same time evacuates the foreign liquid extracted by precipitation from the lighter liquid to be purified.

A further object is to provide a device of this nature that consists of a few simple parts, which will efficiently perform the desired separation completely, and will not get out of order easily.

Two forms of this apparatus are described below and illustrated in the accompanying drawing, in which:

Fig. 2 is another longitudinal sectional view of a modified form of the apparatus in which the foreign liquid is extracted by precipitation and in addition by absorption.

Figure 1:
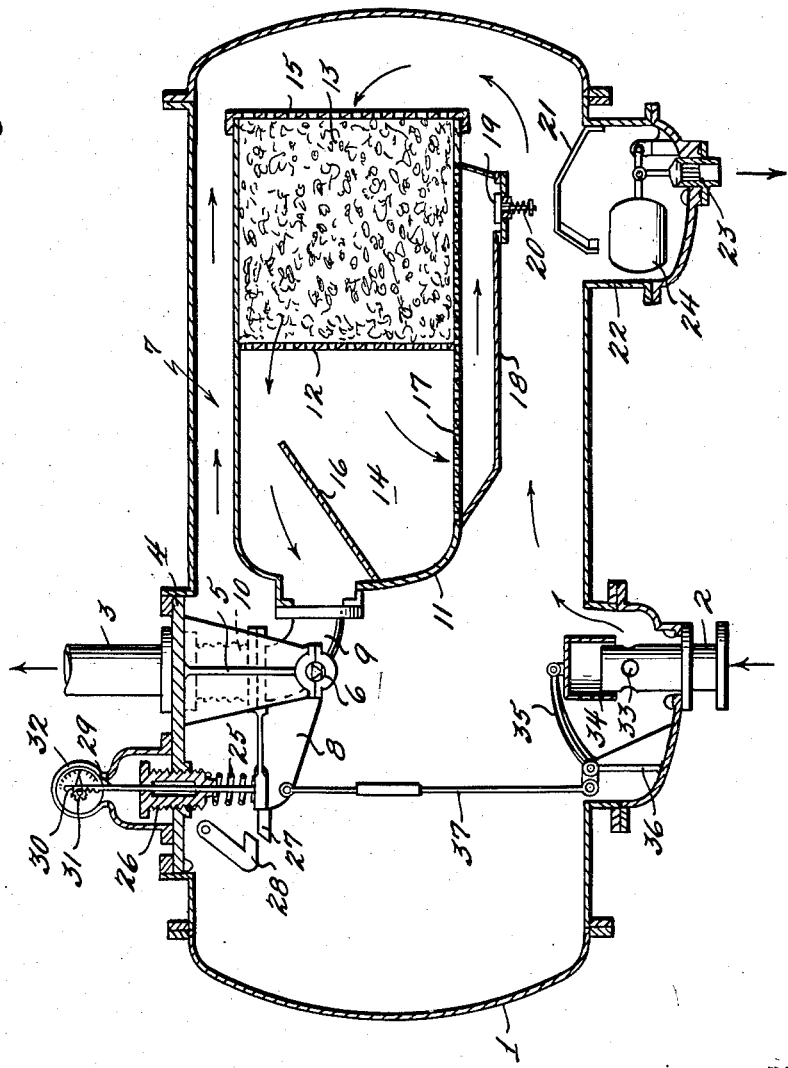
Fig. 1 is a longitudinal sectional view of one form of the apparatus in which the foreign liquid is extracted by simple precipitation from the liquid to be purified.

In the form of invention shown in Fig. 1, the apparatus comprises an elongated closed round-bottom tank 1, provided at the bottom and in the vicinity of the one end with a tubular intake fitting 2 for the inlet of the liquid to be purified, and at the top with a tubular discharge fitting 3 for the discharge of the purified liquid. The fitting 3 is provided with a closure plate 4. From this closure plate are suspended supports 5 which are provided at their lower portions with bearings to receive the "knife-edges" 6 of a tilting balance 7, which is an essential member of the apparatus. It comprises an arm or counter-beam 8 which carries the knife-edges 6 and is connected with a bent pipe 9 communicating at one end through the intermediary of a flexible tube of the "bellows" type 10, with discharge fitting 3, and at the other end with a tubular chamber 11 forming the beam of the tilting balance.

The arrangement is such that from the knife edge 6 the beam extends towards one end of the round-bottom tank 1 and the counter-beam 8 extends towards the other end of the round-bottom tank. The tubular chamber 11 is divided internally by a transverse grill or screen 12 into a separating compartment 13 filled with compressed fibers of wood or other material suitable to the result to be attained, and a precipitating compartment 14 which communicates with the bent tube or elbow 9. The free end of the chamber 11, opposite the elbow 9, is open and simply screened by a grill or screen 15 that is permeable to the liquid, so that the separating compartment 13 is comprised between the two screens or grills 12 and 15.

From a point below the elbow 9, there projects from the inside of the precipitating compartment 14 a transverse partition 16 extending obliquely upwards terminating at a certain distance from the top of the chamber 11. This transverse partition 16 serves as a deflector. The chamber 11 is slotted or perforated from one end to the other in the bottom at 17, and communicates with a closed catch basin 18 integral therewith. In the bottom of this basin and below the separating compartment 13 there is provided an opening controlled by a spring closed valve 19 which opens into the basin and has a stem 20 extending below the bottom. Beneath stop 21 the bottom of tank 1 is provided with a collecting sump 22 provided with a tubular discharge fitting 23. The discharge through fitting 23 is controlled by an automatic blow-off device actuated by a densimetric float 24. The equilibrium of the tilting balance is assured by a spring 25 interposed between the counter-beam 8 and an adjustable stop 26 screwed into the plate 4.

The operation of the part of the apparatus described so far is as follows:

The liquid to be purified, coming in through the fitting 2, fills the round-bottom tank 1 and then circulates towards the free end of the tubular chamber 11, that is to say in the direction of the arrows, to penetrate through the grill or screen 15 into the separating compartment 13 in which the filling of compressed fibers assures the conglomeration of the particles of water in a known manner. The lighter liquid to be purified rises progressively, while the particles of water descend in proportion as the current carries them along, to form in the bottom a mass which falls into the basin 18 under the slot or the perforations of the bottom of the chamber 11. The separation is effected in the precipitating compartment, assisted by the deflector 16 which directs the water downward and permits the purified, lighter liquid to pass above its free edge towards the elbow 9, and towards the discharge fitting 3.

In proportion as the water accumulates in the basin 18, the chamber 11, which is a part of the beam of the tilting balance, becomes increasingly heavy and is lowered against the effect of the spring 25. The stem 20 of the valve 19 finally comes to rest on the stop 21, so that the valve 19 opens against the effect of its spring, permitting the water in basin 18 to flow therefrom. The water which runs out of the basin falls into the collecting tank 22 in which its level rises to raise the densimetric float 24 which thus opens the valve associated with discharge fitting 23 to permit discharge of the water.

As soon as the water begins to run out of the basin 18, the beam of the tilting balance becomes lighter and therefore has a tendency to rise again, and thereby effects the closing of valve 19. If a device is not provided to prevent this, the beam will therefore remain permanently in its lower position since the basin could not empty itself completely.

According to the invention to overcome this, there is provided a latch mechanism including a nose 27 extending from the counter-beam 8 and cooperating with a catch 28 fixed to a shaft extending to the outside of the tank 1 and provided with an actuating handle (not shown). The arrangement is such that the nose 27 is retained by the catch 28 when the beam of the tilting balance reaches its lowest position in which the valve 19 is open.

The adjustable stop 26 is a tubular element in which is mounted a vertically sliding stem 29 resting on the upper side of the counter-beam 8. The upper part of this stem is formed with rack teeth 30, which engage with a pinion 31 for rotation of the hand of an indicating instrument 32. The position of the hand permits the operator to follow the movements of the tilting balance and to intervene in actuating the handle of the catch 28 in order to set the tilting balance free when he considers it useful or necessary. Similarly there may be provided any warning signal, which indicates to the operator the instant at which the beam of the tilting balance reaches its lowest position, in order that he can leave it in this position during the time needed for the emptying of the basin 18.

Finally, in order not to interfere with the descent of the water into the collecting basin through the liquid to be purified which fiills the tank 1, it is necessary to stop the circulation of this liquid through the tank. For this purpose, the inlet fitting 2 is provided with a slide valve 34, operated by counter-beam 8. As shown, the fitting 2 extends inwardly into the tank 1 and is perforated with lateral orifices 33 in its upper part. On the upper part of tube 2 is mounted a slide valve 34. Slide valve 34 is pivotally connected to an arm of a lever 35 pivoted on a support 36 carried by the wall of the tank 1. The other arm of this lever is connected by a connecting rod 37 of adjustable length to the counter-beam 8. The operation is such that the slide valve 34 progressively masks the openings 33, when the counter-beam 8 rises, that is to say, when the beam 11 falls and reaches its lowest position, which slows down the speed of the liquid, facilitates its decantation and finally stops the entrance of the liquid to be purified and its circulation through the apparatus.

This circulation is re-established as soon as the beam is set free by manually shifting the catch 28 and rises again to its highest position.

In a modification, the basin 18 may contin an automatic densimetric blow-off device, connected by a flexible system of pipes of the "bellows" type to the outside in order to evacuate the denser liquid directly.

The operation of the form of invention shown in Fig. 1 is clear from the above description, where the operation of the apparatus has been set out in association with the particular parts being described. The operator admits the liquid to be treated by manipulation of the latch 28, whereupon the incoming liquid travels into chamber 13, where the more dense liquid is agglomerated and gravitates to basin 18, and the lighter liquid, plus any of the denser liquid not removed in chamber 13 moves into chamber 14. In this chamber 14 denser liquid encounters baffle or partition 16 and gravitates to the basin through apertures 17. The lighter liquid passes on to outlet 3. As basin 18 fills, its weight increases and it descends and counter-beam 8 ascends to close inlet 2. Upon sufficient lowering, the stem 20 of valve 19 in basin 18 engages stop 21 and is open and allows the exit of the denser liquid from the basin into collecting tank 22, provided with the float controlled densimetric apparatus which opens outlet valve 23 for the dense liquid, which has been separated when the level of denser liquid is high enough. The operator can then control a repetition of the operation by observing the indicator 32 and operating latch 28 at the desired time.

The form of invention shown in Fig. 2 differs in that it comprises not only a separating device of the type which has just been described in connection with Fig. 1 but also an absorption device intended to eliminate from the liquid to be purified the last traces of the foreign liquid or impurity.

As shown in Fig. 2 the tank 38 is internally divided by a tight transverse partition 39 into two compartments 40 and 41. In this partition is tightly fitted a chamber 42, open at both ends, which two openings are simply masked by grills or screens, between which is compressed the filling of fibers of wood or the like. The separating chamber is therefore stationary in this case. The liquid to be purified, arriving through the lower inlet fitting 43, enters into the compartment 40 and flows into the chamber 42 through one side. The filling assures the extraction of the foreign liquid, for example water, which falls as a result of its higher density and runs out of the chamber onto the bottom of the compartment 41, to accumulate in the collecting sump 44 provided at the other end of the tank, while the lighter, substantially purified liquid continues to circulate in a substantially horizontal direction into the compartment 41 towards the other end of the tank.

In this compartment 41 there is mounted a tilting balance similar to that described in connection with Fig. 1, but comprising only a beam without a counter-beam. This beam comprises a tubular chamber 49 carried by arms 45 which are pivotally mounted by a fulcrum on a support carried by a closure plate 47 mounted on an opening in the top of tank 38. The support also includes a tubular elbow 46 which is connected at its upper end to a discharge fitting 48. At its lower end the elbow 46 is connected to the chamber 49 by a flexible bellows type tube 50 extending between arms 45. The end of the tubular chamber opposite the fulcrum is open and simply masked by a grill or screen 51. In the other end of the chamber is provided a second grill or screen 52. Between the two screens is compressed a material 53 capable of absorbing the last traces of the foreign liquid which the liquid to be purified may still contain. In the bottom of the chamber is a hole 49a permitting the foreign liquid to run out under the influence of gravity.

The beam is kept in equilibrium because it is suspended by a connecting rod 54, carried by an adjustably loaded spring 55, which is supported on a spherical stop resting in a seat 56. This spring permits the beam to fall in proportion as its weight is increased by the absorption of the foreign liquid. The arms 45 are connected to an indicating device in the manner previously described relative to Fig. 1.

In the intake fitting 43 there is a slide valve 57 perforated with lateral openings which are adapted to register with other lateral openings cut into the inwardly extending portion of fitting 43. This slide valve is pivotally connected to a lever 58 fixed to one end of a longitudinal shaft 59 rotatably mounted in bearings in the tank 38. The opposite end of the shaft carries a lever connected by a connecting rod 60 to the chamber 49 of the beam. The operation is such that the slide valve 57 rises in proportion as the beam lowers. In the position represented in Fig. 2, which is that of the beginning of an operating cycle, the beam, not loaded with foreign liquid, is kept in the upper position by its balancing device 54, 55 while the slide valve 57 is at the lowest point, with its openings in register with those of the fitting 43, so that the liquid to be purified can enter freely into the compartment 40. This liquid traverses the chamber 42 in which it gets rid of the greater part of the foreign liquid, which falls to the bottom of the tank and accumulates in the collecting sump 44, which then empties automatically in the manner described in connection with Fig. 1. The partially purified liquid follows the course indicated by the arrows and enters through the screen 51 into the chamber 49 of the beam which contains the absorbent material. This retains the last traces of the foreign liquid, while the perfectly purified liquid passes through the "bellows" 50 into the elbow 46 and leaves through the discharge fitting 48. In synchronism with the lowering of the beam, the slide valve 57 rises again, so that its lateral orifices are gradually displaced out of register with those of the inlet fitting 43. The slide valve finally masks the openings of the inlet fitting, thus stopping the entrance of the liquid to be purified into the compartment 40 of the tank and the discharge of purified liquid therefrom. The operator, warned by the cessation of discharge and by the indicator, must exchange the absorbent material in order to put the apparatus back into an operating condition.

The use and operation of this modification of the invention is clear from the above description thereof and the operation of corresponding parts set out in connection with the form of the invention shown in Figure 1, so that no further description is considered necessary.

Of course it is not necessary that the separator and the absorber be mounted in one and the same tank. On the contrary, one can mount the separator in a tank, for example in the manner described in view of Fig. 1, and the absorber in another communicating tank in order to obtain the operation which has just been described in view of Fig. 2.

Without departing from the principle of the invention, other variants and modifications are apparent.

It is thus seen that this invention provides an apparatus consisting of a few simple easy-working constructions, which will not get out of order easily and yet will efficiently perform the desired function of completely separating more dense from less dense liquids.

Having described my invention, I claim:

1. Apparatus for separating a mixture of liquids of different densities, comprising a tank having at one end a lower inlet for the mixture, an upper outlet for the lighter component, and at the other end a lower outlet for the heavier component, a balance-beam mounted in said tank, a chamber secured to said balance-beam and in communication with the tank at the free end, flexible conveying means for connecting the other end of said chamber to said outlet for the lighter component, means in said chamber for separating the mixture and for collecting the falling heavier component at the bottom of said chamber, while passing the rising lighter component to said upper outlet, a counter-beam secured to said balance-beam, means acting on said counter-beam to balance said chamber with the mixture therein, a valve on said inlet, and means connecting said valve to said counter-beam and acting to close said valve during a falling movement of said chamber.

2. Apparatus as claimed in claim 1, in which said chamber is divided internally by a transverse screen into a separating compartment filled with a wadding of a suitable separting material and in communication with the tank through a screen at the free end, and into a precipitating compartment connected through a flexible hose to the upper outlet of the lighter component.

3. Apparatus as claimed in claim 1, in which said chamber is divided internally by a transverse screen into a separating compartment and a precipitating compartment connected to the upper outlet of the lighter component through a flexible hose, and at the outlet end of which projects from the bottom a transverse baffle inclined toward the transverse screen and ending at a certain distance from the top of said precipitating compartment.

4. Apparatus as claimed in claim 1, in which the bottom of said chamber is perforated from one end to the other, and this chamber communicates through this perforated bottom with a closed collecting trough secured thereto, the bottom of which is provided with a spring-closed valve which opens into the trough and has a depending stem adapted to cooperate with a stop at the end of the falling movement of balance-beam to open the valve.

5. Apparatus as claimed in claim 1, in which a device is provided to latch the balance-beam at the end of the falling movement of said chamber.

6. Apparatus as claimed in claim 1, in which a nose extending from the counter-beam is adapted to cooperate with a catch secured to a shaft extending to the outside of the tank and provided with a control handle, the arrangement being such that the nose is retained by the catch at the end of the falling movement of said chamber.

References Cited in the file of this patent

UNITED STATES PATENTS

| | | |
|---|---|---|
| 232,735 | Loomis | Sept. 28, 1880 |
| 2,243,988 | Stone | June 3, 1941 |
| 2,412,841 | Spangler | Dec. 17, 1946 |
| 2,597,475 | Grise | May 20, 1952 |

FOREIGN PATENTS

| | | |
|---|---|---|
| 9,953 | Great Britain | Apr. 30, 1898 |